UNITED STATES PATENT OFFICE.

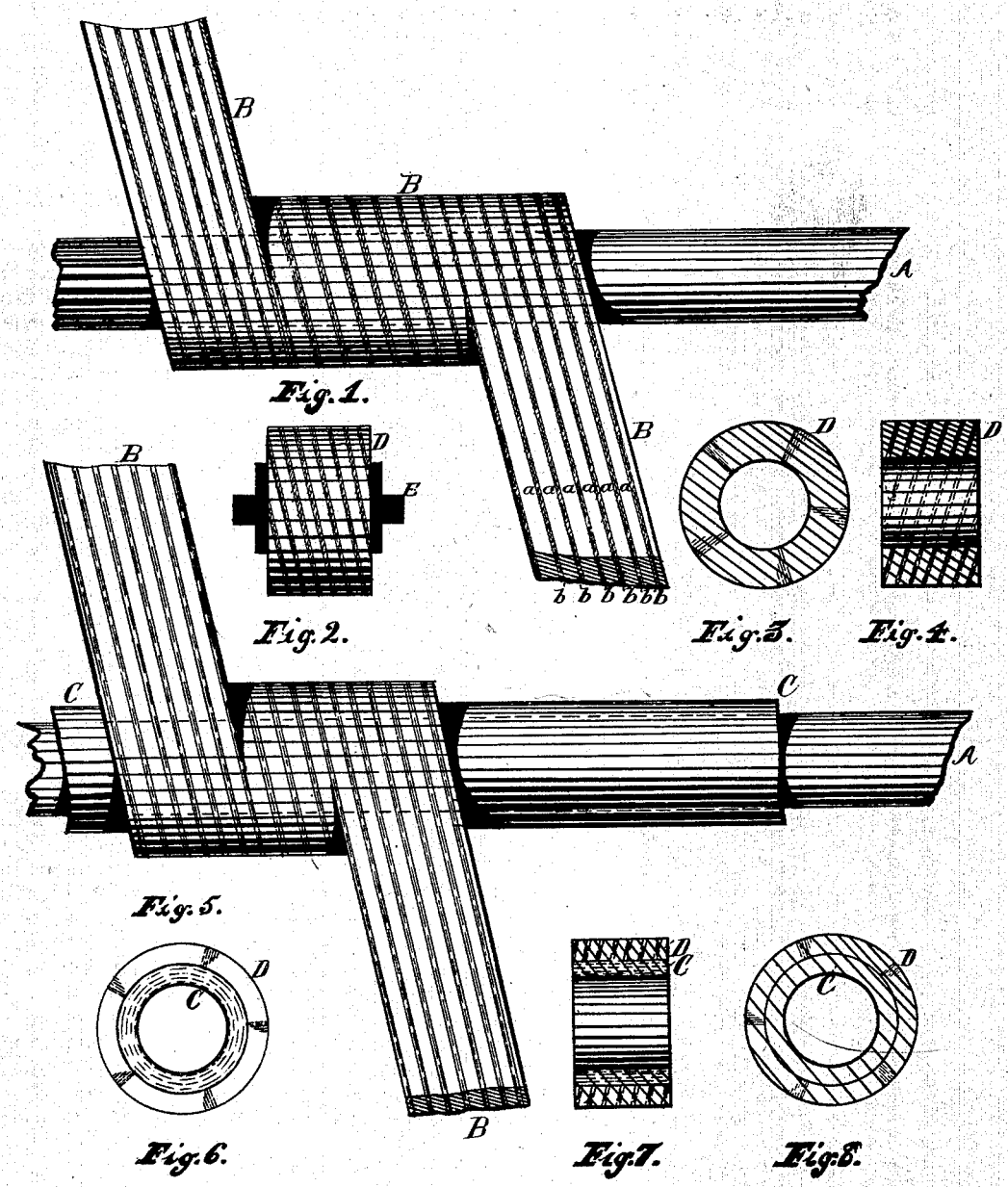

ROBERT B. HUGUNIN, OF NEW YORK, N. Y.

IMPROVEMENT IN COMBINED RUBBER AND CLOTH SURFACED ROLLERS.

Specification forming part of Letters Patent No. 146,255, dated January 6, 1874; application filed December 26, 1873.

*To all whom it may concern:*

Be it known that I, ROBERT B. HUGUNIN, of New York, in the county of New York and State of New York, have invented certain new and useful Improvements in Combining Rubber and Fabric for Manufacturing Anti-Friction and Adhesion Rollers, of which the following is a specification:

The object of this invention is to produce a new and improved anti-friction and adhesion roller, the bearing-surface of which will be so constructed as to present to the body with which it is brought in contact the combined edges of sheets or layers of rubber and cloth, or other textile material, and the said material being arranged in position so that when in contact with a moving body the cloth will tend to lessen the friction of the rubber and add to its efficiency and durability, while the rubber will tend to create a frictional contact, and hold the body upon which it acts in the position it is desired, unless acted upon by force. In order to produce such a roller my invention consists in combining with and interposing between a series of layers or sheets or strips of cloth, felt, or other suitable textile fabric, the whole being arranged or built up in a mass or pack, one upon the other, of sufficient size and height, and compressed by any suitable means into a solid compact body, after which it is cut into strips of desired and uniform width, and wound or wrapt edgewise and spirally around or upon a core or shaft; or it may be wound, in the above-described manner, directly upon a rubber, or cloth, or other suitable backing previously connected with the core or mandrel, thus forming a cylindrical body, after which the cylinder thus formed is properly vulcanized, when rollers of the desired length are cut or sawed transversely therefrom, the core being removed, when a completed and finished roller is produced ready to receive a shaft or arbor to form its axis, and each roller thus manufactured will be found to possess in an eminent degree a uniform diameter, and an evenly-centered axis, and, most important of all, will be found to have a rubber and cloth bearing or engaging surface, the cloth serving to lessen friction and the rubber creating an adhesion when the roller is brought in contact with a moving body, thus combining in itself an anti-friction and adhesion surface, whereby the roller is adapted for many uses.

In the drawings, Figure 1 is a side view of a core or mandrel, illustrating the manner in which the combined strips of rubber and fabric are applied. Fig. 2, a plan view of a completed roller cut from the cylinder illustrated in Fig. 1, after the same has been vulcanized, the roller being provided with its journal or arbor. Fig. 3 is an end view of the completed roller. Fig. 4 is a section of the same. Fig. 5 is a side view of a core or mandrel illustrating an inner wrap of rubber, or rubber and cloth, applied prior to applying the strips of rubber and fabric for producing the anti-friction and adhesion bearing-surface. Fig. 6 is an end view of a completed and finished roller, transversely cut from the cylinder illustrated in Fig. 5 after the same has been vulcanized. Fig. 7 is a vertical section of the roller illustrated in Fig. 6. Fig. 8 is an end view of the same, showing an inner wrap of rubber without cloth.

Like letters of reference indicate corresponding parts in each figure.

The letter A designates a core or mandrel, upon which the strips B of rubber or cloth, felt, or other textile fabric, are edgewise and spirally wound. These strips are produced by arranging a series of layers or sheets of rubber, *a*, one upon another, first interposing between each one or more sheets of cloth, felt, or other suitable fabric, *b*, and when the mass or pack is thus arranged in a proper size and height, the whole is subjected to pressure by any suitable means, preferably by calendering them, until the entire mass or pack is brought into a solid compact body, each firmly connected so as to resist a lateral separation. When thus united the pack is cut up into strips or welts B, of any desired width, or of a width equal to the thickness of the material required over the axis of the roller, and they are wrapped or wound edgewise and spirally directly upon the core or mandrel A, the sides of the strips abutting against each other, and then compressed endwise on the core, so as to unite all closely together and form an imperceptible joint, as illustrated in the several figures, the edges of the rubber and fabric presenting themselves throughout the entire external surface of the body or cylinder thus formed.

Instead of wrapping the strips of combined rubber and fabric directly upon the core or mandrel, I propose and intend, in many instances, to wrap or cover the core or mandrel with a suitable thickness or layer of caoutchouc, or raw rubber, or raw rubber and fabric C, as in Fig. 5, and render the same smooth and compact upon the core, and furnish a backing for the interior of the roller when formed. Upon the core thus coated, covered, and protected are applied edgewise and spirally the strips B of rubber and textile fabric, which are compressed endwise on the core or mandrel to unite the parts closely together, the prime object being to have said material present a continuous unbroken external surface, with the rubber and fabric standing edgewise and spirally. The core or mandrel thus wrapped with the combined strips of rubber and fabric, with or without the covering C on the core, is vulcanized to the proper degree or hardness by any of the well-known methods, either by a mold or by incasing the same with several layers or thicknesses of cotton cloth or muslin. When properly vulcanized, the core or mandrel is removed and rollers of the desired width cut from the vulcanized rubber and fabric, ready to receive in their center the arbor or axis for supporting the roller on bearings in proper position, and in the place desired for them to operate. Various sizes of rollers can thus be produced, according to requirements, the diameter of such depending upon the thickness of the pack from which the strips are cut, or upon the diameter of the core, the length being governed according to the purpose to which it is desired to apply the roller.

The prime object of combining the sheets of rubber and cloth, or felt, or other textile material, as hereinbefore stated, is to produce a practical, durable holding and sliding bearing-surface, the presence of the cloth serving to lessen the friction of the rubber when a body is moving upon it, and to add to its efficiency and durability, while the rubber will tend to hold the moving body in the position desired.

It is not necessary that the edges of the cloth and rubber on the holding and sliding surface of the roller should extend inward farther than the practical limit of the wear of the roller till rendered useless. The balance of the body required can be made of a less expensive composition, such being applied prior to applying the strips B.

The application of a roller thus constructed is so varied that it is only deemed necessary to say that it will be employed in all devices where a rolling, sliding, and holding surface is required. It will be found especially applicable in connection with dumb-waiters, sash-holders, and a practical device for preventing a back or reverse motion in a sewing-machine.

Supposing it to operate in connection with a sash-holder wherein the roller is subjected to a spring-pressure and held from turning during a downward movement of the sash, the edges of the rubber on the surface of the roller hold the sash by adhering to the wood composing the same, and the edges of the cloth combined with the rubber receiving, and, from its non-adhering quality, lessening, the wear of the rubber caused by sliding the sash down over the surface of the roller in lowering the same.

I claim as my invention—

An anti-friction and adhesion roller, the external surface of which is made up of a series of strips of rubber and cloth, said strips standing inward edgewise and spiral with the axis of the roller, forming a combined holding and sliding bearing-surface.

In testimony that I claim the foregoing I have hereunto set my hand this 26th day of December, 1873.

ROBERT B. HUGUNIN.

Witnesses:
W. J. PEYTON,
JAMES L. NORRIS.